US008552385B2

(12) United States Patent
Nakashima et al.

(10) Patent No.: US 8,552,385 B2
(45) Date of Patent: Oct. 8, 2013

(54) RADIOACTIVE CONTAMINATION MONITORING DEVICE AND MONITORING METHOD

(75) Inventors: Yasunori Nakashima, Yokohama (JP); Tetsuo Goto, Yokohama (JP); Kenzo Ogawa, Yokohama (JP); Kanji Takahashi, Yokohama (JP)

(73) Assignees: Kabushiki Kaisha Toshiba, Tokyo (JP); Toshiba Power Systems Radiation Techno-Service Co., Ltd., Yokohama-shi (JP); Toshiba Plant Systems & Services Corporation, Yokohama-shi (JP)

( * ) Notice: Subject to any disclaimer, the term of this patent is extended or adjusted under 35 U.S.C. 154(b) by 284 days.

(21) Appl. No.: 13/127,999

(22) PCT Filed: Nov. 10, 2009

(86) PCT No.: PCT/JP2009/005982
§ 371 (c)(1),
(2), (4) Date: Jul. 14, 2011

(87) PCT Pub. No.: WO2010/052937
PCT Pub. Date: May 14, 2010

(65) Prior Publication Data
US 2011/0260068 A1    Oct. 27, 2011

(30) Foreign Application Priority Data
Nov. 10, 2008    (JP) .................................. 2008-287987

(51) Int. Cl.
*G01T 1/20*    (2006.01)
(52) U.S. Cl.
USPC .......................................... 250/362; 250/368

(58) Field of Classification Search
USPC .................................................. 250/362, 368
See application file for complete search history.

(56) References Cited

U.S. PATENT DOCUMENTS 6,545,277 B1 *   4/2003   Kella et al. .................... 250/310
2010/0282975 A1   11/2010   Sumita et al.

FOREIGN PATENT DOCUMENTS

JP    2008 145427    6/2008

OTHER PUBLICATIONS

International Search Report issued Dec. 8, 2009 in Application No. PCT/JP2009/005982 (English Translation Previously Filed, Submitting Japanese Document).
International Preliminary Report on Patentability issued May 19, 2011 in Application No. PCT/JP2009/005982 (With English Translation).

(Continued)

*Primary Examiner* — David Porta
*Assistant Examiner* — Abra Fein
(74) *Attorney, Agent, or Firm* — Oblon, Spivak, McClelland, Maier & Neustadt, L.L.P.

(57) ABSTRACT

Provided are a radioactive contamination monitoring device and a radioactive contamination monitoring method for enabling easy detection of radiation from an object to be monitored in a little surrounding space. The radioactive contamination monitoring device comprises a radiation detection unit, a photoelectric conversion unit for converting the light generated in the radiation detection unit to electricity, and a signal processing unit connected to the photoelectric conversion unit. The radiation detection unit includes a quadrangular prism-shaped light guide bar having a rectangular cross-section and a scintillator attached only to two adjacent side faces of the four side faces of the light guide bar.

8 Claims, 3 Drawing Sheets

(56) References Cited

OTHER PUBLICATIONS

Akio Sumita, et al. "Development of surface contamination monitor for inner face of thin tubes (1)—Development of radiation detector-" Atomic Energy Society of Japan 2007 Nen Haru no Nenkai Yoshishu. p. 290 (Mar. 6, 2007) (Reference Previously Filed, Submitting English Translation Only).

Tetsuo Goto, et al. "Development of surface contamination monitor for inner face of thin tubes (2)—Verification test results-" Atomic Energy Society of Japan 2007 Nen Haru no Nenkai Yoshishu. p. 291 (Mar. 6, 2007) (Reference Previously Filed, Submitting English Translation Only).

English Translation of International Preliminary Report on Patentability and Written Opinion of the International Searching Authority issued Jun. 21, 2011, in Patent Application No. PCT/JP2009/005982.

Sumita, Akio; et al. "Development of surface contamination monitor for inner face of thin tubes (1)—Development of radiation detector-" Atomic Energy Society of Japan 2007 Nen Haru no Nenkai Yoshishu. p. 290 (Mar. 6, 2007).

Goto, Tetsuo; et al, "Development of surface contamination monitor for inner face of thin tubes (2)—Verification test results-" Atomic Energy Society of Japan 2007 Nen Haru no Nenkai Yoshishu. p. 291 (Mar. 6, 2007).

International Search Report issued Dec. 8, 2009 in PCT/JP09/05982 filed Nov. 10, 2009.

* cited by examiner

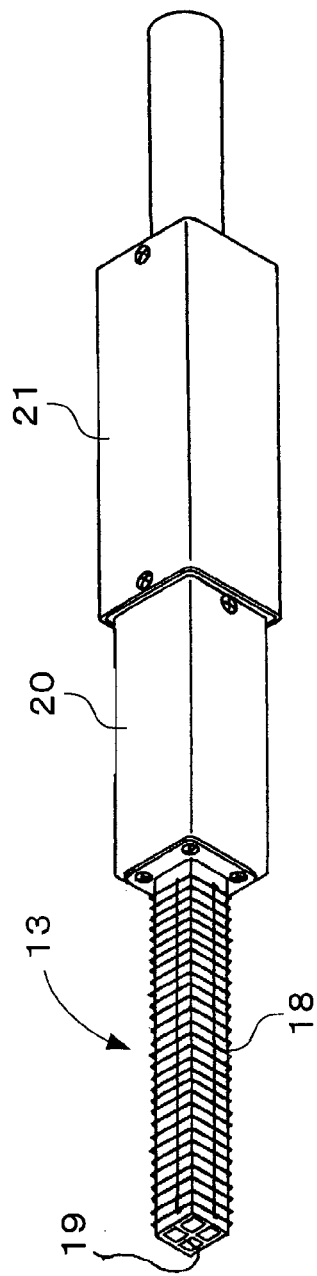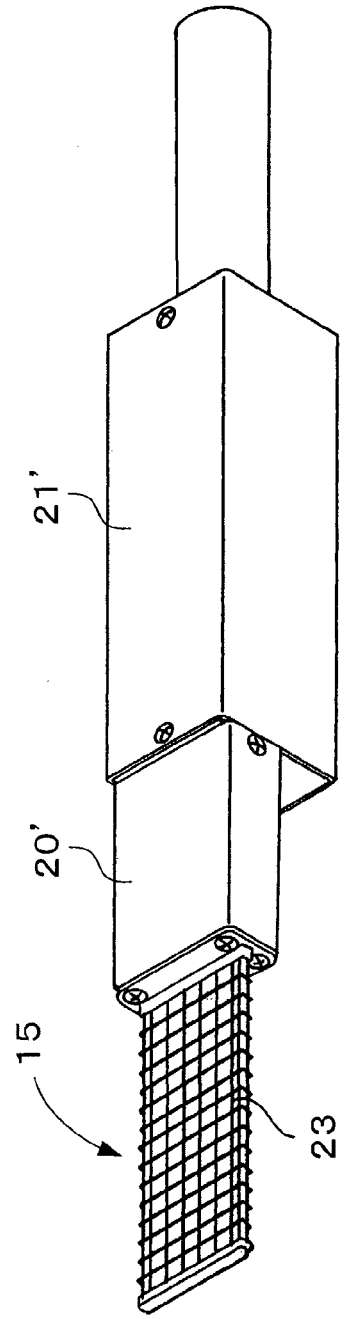
FIG. 4
FIG. 5

RADIOACTIVE CONTAMINATION MONITORING DEVICE AND MONITORING METHOD

TECHNICAL FIELD

The present invention relates to a radioactive contamination monitoring device and a monitoring method, and in particular, relates to a radioactive contamination monitoring device and a monitoring method of monitoring for radioactive contamination of an object to be monitored whose surrounding space is narrow.

BACKGROUND ART

As a main turbine in a nuclear power plant deteriorates due to secular changes, a turbine rotor or nozzle diaphragm is replaced by a new one to improve operation efficiency and enable longer utilization. During the replacement, radioactive substances adhering to an outer surface of the replaced old part such as a turbine rotor and nozzle diaphragm are decontaminated by blasting or the like and it is necessary to check the effect of decontamination by a radioactive contamination monitoring device so that the replaced part can be transported out of a radiation controlled area as domestic waste. On the other hand, surface metals removed by decontamination, sand containing radioactive substances, and parts from which radioactive substances cannot be removed due to a device structure or the like are packed in a drum and temporarily stored on a premise as low level radioactive waste before being transported to a low level radioactive waste burying center where the low level radioactive waste is buried in a concrete pit.

Because the space between nozzle wings to be monitored is very narrow, it has been very difficult to monitor for residual radiation of nozzle wings and the like after decontamination by blasting or the like using a commercial radioactive contamination monitoring device, prolonging a removal work period. For example, the space α between nozzle wings of a turbine rotor is about 3.9 mm to 24 mm and very narrow. Also, through-holes and non-through-holes formed on a horizontal joint surface of a turbine nozzle diaphragm have very small inside diameters.

Thus, to enable measurement of residual radiation of an object to be monitored whose surrounding space is narrow, a method of disassembling and pulling out a turbine rotor or cutting a nozzle diaphragm into three parts of outer rings, inner rings, and nozzle wings and then monitoring for residual radiation is commonly used. Because a nozzle wing is cast into an outer wing and inner wing, there has been no choice, but to mechanically cut or fuse for disassembly.

In one plant of 1100 MWh class, there are 8 stages×1 nozzle diaphragms into which the above nozzle wings are incorporated for a high-pressure turbine and 9 stages×3 nozzle diaphragms for a low-pressure turbine so that the number of nozzle plates amounts to about 10,000. A challenge is to reduce processes, save resources such as time, labor, and power, and also reduce installation costs of facilities by enabling storage of such nozzle plates as they are without cutting.

Fusing at high temperature is more efficient when compared with mechanical cutting, but radioactive substances may be melted and cured in a fusion zone, making work to grind/cut the fusion zone unavoidable to remove residual radioactive substances completely. Thus, it becomes necessary to reduce offcut (low level radioactive waste) in which radioactive substances are melted and generated by cutting, to be careful with fire, and to take safety measures including installation of a ventilator and a filter to remove fumes during cutting. Further, it is also necessary to secure a wide area within a limited radiation controlled area to make measurements with a radioactive contamination monitoring device.

Patent Literature 1 discloses a radioactive contamination monitoring device that enables easy monitoring for radioactive contamination of an inner surface of a tube. That is, a radiation detection unit configured by attaching scintillators or the like to a rod-like transparent guide line portion extended from a cylindrical photoelectric conversion unit and attaching a light shielding portion that allows radiation to pass through, but blocks light to an outer side thereof is disclosed. However, the radiation detection unit shown by Patent Literature 1 is intended for radiation measurement of an inner surface of a tube and has difficulty in monitoring a through-hole, a non-through-hole, or an object to be monitored whose surrounding space is narrow.

CITATION LIST

Patent Literature

PLT 1: Japanese Patent Application Laid-Open No. 2008-145427

SUMMARY OF THE INVENTION

Technical Problem

To solve the above problems, an object of the present application is to provide a radioactive contamination monitoring device and a monitoring method capable of easily detecting radiation of a through-hole, a non-through-hole, or an object to be monitored whose surrounding space is narrow without disassembling, cutting, or fusing an object to be monitored.

Solution to Problem

A radioactive contamination monitoring device according to an embodiment of the present application includes a radiation detection unit, a photoelectric conversion unit that converts light generated in the radiation detection unit into electricity, and a signal processing unit connected to the photoelectric conversion unit. The radiation detection unit according to the present embodiment includes a quadrangular prism-shaped light guide bar having a rectangular cross-section and a scintillator mounted on only two adjacent side faces of four side faces of the light guide bar.

In the radioactive contamination monitoring device according to another embodiment of the present application, the light guide bar has a square cross-section, and the scintillator is further attached to a tip of the light guide bar.

In another embodiment of the present application, the scintillator is clad in a grid-like protective member.

In still another embodiment of the present application, the scintillator attached to the tip of the light guide bar having the square cross-section and the scintillator mounted on the two adjacent side faces are clad in a grid-like protective member.

In yet another embodiment of the present application, the grid-like protective member is formed of stainless steel.

In a radioactive contamination monitoring method according to an embodiment of the present application, the radiation detection unit in which the light guide bar has a square cross-section is inserted into the through-hole and half the surface of the inner surface of the through-hole is monitored for the radioactive contamination. According to this method, the radiation detection unit is inverted around an axis in a longitudinal direction thereof and the remaining surface of the inner surface of the through-hole is monitored for the radioactive contamination.

In a radioactive contamination monitoring method according to another embodiment of the present application, the radiation detection unit in which the light guide bar has a square cross-section and the scintillator is arranged at a bottom thereof is inserted into the non-through-hole and at least half the surface of the inner surface of the non-through-hole is monitored for the radioactive contamination. According to this method, the radiation detection unit is inverted around an axis in a longitudinal direction thereof and the remaining surface of the inner surface of the non-through-hole is monitored for the radioactive contamination.

In a radioactive contamination monitoring method according to still another embodiment of the present application, the radiation detection unit in which the light guide bar has a square cross-section is inserted into the narrow space surrounding the object to be monitored and one side of the object to be monitored is monitored for the radioactive contamination. According to this method, the radiation detection unit is inverted around an axis in a longitudinal direction thereof and the other side face of the object to be monitored is monitored for the radioactive contamination.

As is understood by those skilled in the art, the present application can be carried out by other embodiments and details of some of them can be modified in various obvious modes without deviating from the scope of the present application. Therefore, drawings and descriptions should be considered actually intended as illustrations rather than limitations.

Advantageous Effects of Invention

According to an embodiment of the present application, a radioactive contamination monitoring device and a monitoring method capable of easily detecting radiation of a through-hole, a non-through-hole, or an object to be monitored whose surrounding space is narrow without disassembling, cutting, or fusing an object to be monitored.

Other advantages, modes, and features of the present application will be clear to those skilled in the art from the following describing a preferred embodiment of the present application as an illustration of the most preferred embodiment to carry out the present application.

BRIEF DESCRIPTION OF THE DRAWINGS

FIG. 4 is a schematic diagram of a configuration of the radiation detection unit according to another embodiment of the present invention.

FIG. 5 is a schematic diagram of the structure of the radiation detection unit according to still another embodiment of the present invention.

DESCRIPTION OF EMBODIMENTS

Embodiments according to the present invention will be described below with reference to drawings when appropriate. A detailed description of a common structure of a radioactive contamination monitoring device, for example, a radiation detection unit using scintillators, a photoelectric conversion unit that makes a photoelectric conversion of a detected signal by an electron multiplier tube, and a signal processing unit that is also described in Patent Literature 1 described above is omitted and instead, features of the present application will be described.

Figure 1:
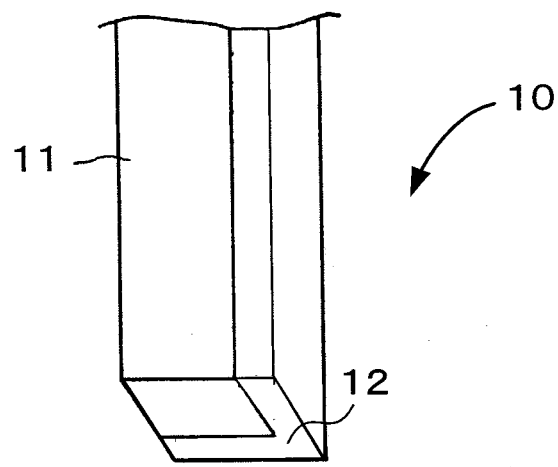
FIG. 1 is a schematic diagram of a radiation detection unit according to an embodiment of the present invention.

FIG. 1 shows a radiation detection unit according to an embodiment of the present invention. A light guide bar 11 of a radiation detection unit 10 shown in FIG. 1 has a rod shape and is a regular quadrangular prism having a square cross-section. A scintillator 12 is arranged on two adjacent side faces of the light guide bar 11. As described later, the radiation detection unit 10 is suitable for monitoring for radioactive contamination of an inner surface of a through-hole such as a tapped hole.

Figure 2:
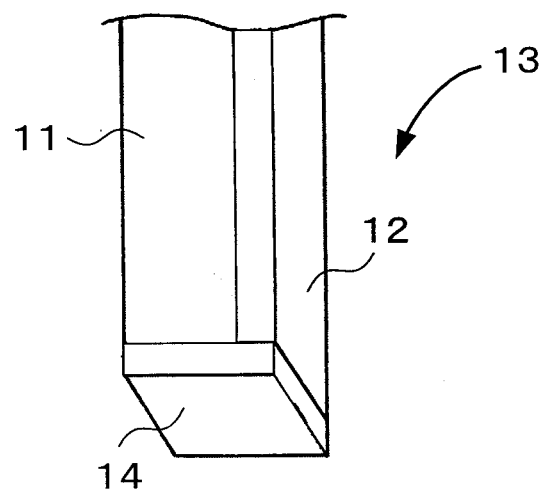
FIG. 2 is a schematic diagram of the radiation detection unit according to another embodiment of the present invention.

FIG. 2 shows the radiation detection unit according to another embodiment of the present invention. In a radiation detection unit 13 shown in FIG. 2, a scintillator 14 is also arranged at the tip of the light guide bar 11, in addition to the two adjacent side faces where the scintillator 12 is arranged in the radiation detection unit 10 shown in FIG. 1. The radiation detection unit 13 is suitable for monitoring for radioactive contamination of an inner surface of a non-through-hole such as a tapped hole with a bottom.

Figure 3:
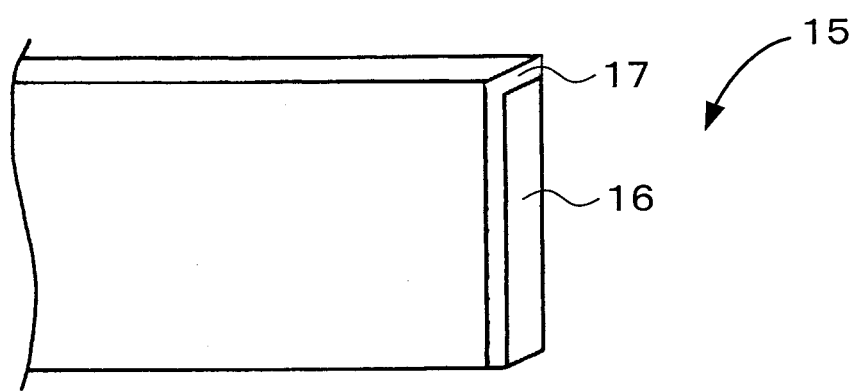
FIG. 3 is a schematic diagram of the radiation detection unit according to still another embodiment of the present invention.

FIG. 3 shows the radiation detection unit according to still another embodiment of the present invention. In a radiation detection unit 15 shown in FIG. 3, a light guide bar 16 has a flat plate shape and is a quadrangular prism having a rectangular cross-section. A scintillator 17 is arranged on two side faces containing a long side and short side adjacent at the bottom of the radiation detection unit 15. In the shape shown in FIG. 3, the thickness of the scintillator 17 can be set to 2 mm and the thickness of the light guide bar 16 to 4 mm. As a result, the thickness of the radiation detection unit 15 becomes 6 mm so that the radiation detection unit 15 in a flat plate shape can be inserted deep into a narrow location.

FIG. 4 and FIG. 5 show a configuration of the radiation detection unit in which the scintillator is covered with a grid-like protective member according to another embodiment of the present invention. The protective member is provided to prevent the scintillator of the radiation detection unit in a rod or flat plate shape from being contaminated or damaged by an impact or contact with other members.

FIG. 4 shows a protective member 19 formed in a cross shape to mechanically protect the scintillator 14 arranged at the tip of the rod-like radiation detection unit 13 shown in FIG. 2 and a grid-like protective member 18 to mechanically protect the scintillator 12 arranged on the side face. In the protective member in a cross shape or grid shape, a portion of the cross or grid is made of a member of high strength and other portions are voids. As is easily understood by those skilled in the art, the cross shape or the grid shape is only an illustration and is not intended to limit the shape and other mesh shapes may also be applied.

FIG. 4 shows a photoelectric conversion unit 20 and a signal processing unit 21. The photoelectric conversion unit 20 converts light generated when radiation enters the radiation detection unit 13 into an electric signal. The signal processing unit 21 is connected to the photoelectric conversion unit 20 and performs processing such as a wave height analysis of an electric signal output from the photoelectric conversion unit 20. Though a figure in which the rod-like radiation detection unit 10 is clad in a grid-like protective member is not shown in FIG. 1, the configuration is almost the same as the configuration excluding the protective member 19 to protect the scintillator 14 arranged at the tip of the radiation detection unit 13 shown in FIG. 4.

FIG. 5 shows the configuration in which the outer circumference of the radiation detection unit 15 in a flat plate shape shown in FIG. 3 is clad in a grid-like protective member 23. A photoelectric conversion unit 20' and a signal processing unit 21' are also shown in FIG. 5. The functions of the photoelectric conversion unit 20' and the signal processing unit 21' are the same as those of the photoelectric conversion unit 20 and a signal processing unit 21 respectively.

The protective member 19 in a cross shape and the grid-like protective members 18 and 23 are formed of stainless steel and the opening ration thereof is set to 85%. This value of the opening ratio is a value that minimizes radiation shielding by stainless steel and also enables the maintenance of an impact resistance prevention function.

The radiation detection units shown in FIGS. 1 to 5 have, as described above, a scintillator arranged on only two adjacent side faces of four side faces of a quadrangular prism. Thus, faces of an object to be monitored that can be monitored at a time are only faces opposite to the two adjacent side faces where the scintillator of the radiation detection unit and other faces cannot be monitored at the same time. If scintillators are arranged on all side faces of the quadrangular prism, radioactive contamination can be monitored for on all faces at the same time. However, as described above, dimensions allowing insertion into a tapped hole whose hole diameter is small or a narrow portion for monitoring of such locations are limited. Thus, as described above, the scintillator is arranged on only two adjacent side faces.

According to an embodiment of the present application, as is evident from the above description of embodiments, a radioactive contamination monitoring device capable of simplifying radiation detection work of a through-hole, a non-through-hole, or an object to be monitored whose surrounding space is narrow, simplifying the processing method, shortening processes, and reducing work costs and also easily detecting radiation of a through-hole, a non-through-hole, or an object to be monitored whose surrounding space is narrow can be provided.

Next, the method of monitoring for radioactive contamination using the above radioactive contamination monitoring device in an embodiment according to the present application will be described with reference to FIG. 6, FIG. 1, FIG. 2, and FIG. 4 by taking a through tapped hole and a tapped hole that is a non-through-hole with a bottom as examples.

First, the method of monitoring for radioactive contamination of the inner surface of a through tapped hole 25 shown in FIG. 6 will be described. In this case, the radiation detection unit 10 shown in FIG. 1 is inserted into the through-hole 25 from, for example, the upper side in FIG. 6. It is assumed here that the scintillator 12 of the radiation detection unit 10 is arranged on the right side and the rear side of the radiation detection unit 10 in FIG. 6. In this case, the right side and the rear side in FIG. 6 of the inner surface of the through-hole 25 are monitored for radioactive contamination. If the dimension of the scintillator 12 in the longitudinal direction is equal to the length of the through-hole 25 or more, monitoring of radioactive contamination is completed for half the inner surface of the through-hole 25. Next, the radiation detection unit 10 is inverted around an axis in the longitudinal direction thereof. At this point, the scintillator 12 of the radiation detection unit 10 is positioned on the left side the front side of the radiation detection unit 10 in FIG. 6. In this state, the radiation detection unit 10 is inserted into the through-hole 25 again from the upper side in FIG. 6. In this manner, monitoring of radioactive contamination of the remaining inner surface of the through-hole 25, which is not monitored, is completed. A case when monitoring is performed using the radiation detection unit 10 is described, but the radiation detection unit 13 shown in FIG. 4 may be used for the monitoring. In such a case, however, the scintillator 14 arranged at the tip of the radiation detection unit and the protective member 19 are not necessarily needed.

Figure 6:
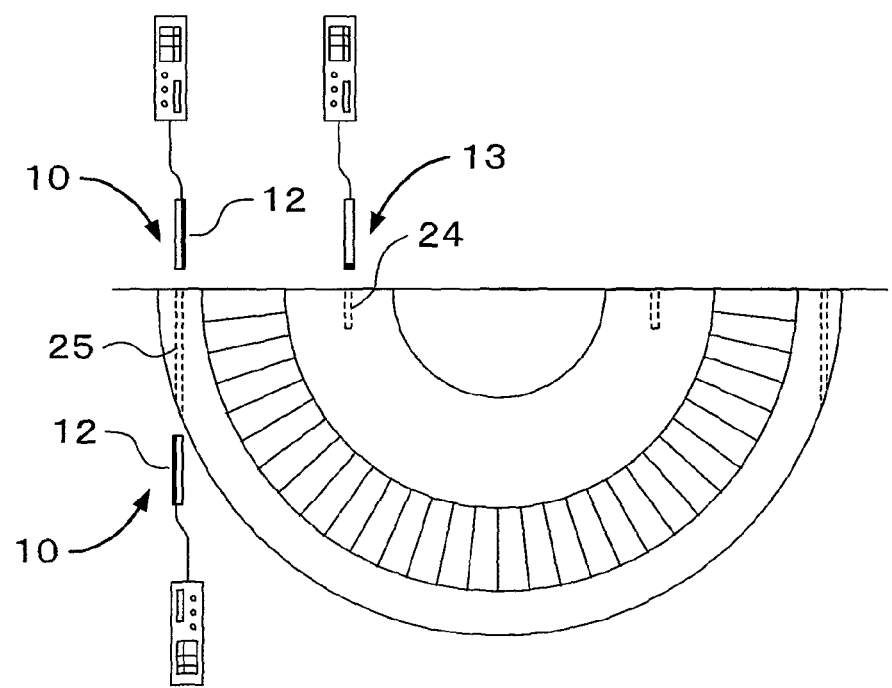
FIG. 6 is a diagram illustrating a method of monitoring for radioactive contamination of an inner surface of a through-hole and a non-through-hole according to an embodiment of the present invention.

If the length of a through-hole is long, as shown in FIG. 6, after the above monitoring from above is completed, the radiation detection unit is inserted again from below to perform monitoring in the same as way as the monitoring from above.

When monitoring of the inner surface of a non-through-hole 24 shown in FIG. 6 is performed by using the radiation detection unit 13 having a scintillator also at the tip of the rod like radiation detection unit shown in FIG. 2 and FIG. 4, monitoring can be performed by a method similar to the above monitoring method of the through-hole 25. In this case, a scintillator is arranged at the tip of the radiation detection unit 13 and thus, not only an inner side face of the non-through-hole 24, but also the bottom face of the non-through-hole 24 can be monitored for radioactive contamination.

Figure 7:
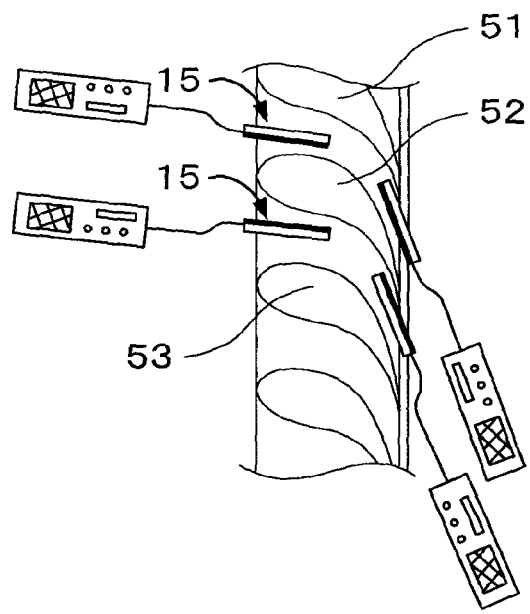
FIG. 7 is a diagram illustrating the method of monitoring for radioactive contamination of two surfaces of an object to be monitored whose surrounding space is narrow according to another embodiment of the present invention.

Next, the method of monitoring for radioactive contamination when the space surrounding an object to be monitored is narrow by using the above radioactive contamination monitoring device in an embodiment according to the present application will be described with reference to FIG. 7 by taking nozzle wings of a turbine rotor as an example. In this case, the radiation detection unit 15 in a flat plate shape shown in FIG. 3 and FIG. 5 is effectively used. FIG. 7 shows a plurality of nozzle wings. In the description that follows, monitoring of radioactive contamination of a nozzle wing 52 will be described. Every nozzle wing extends in a direction perpendicular to the paper surface. First, as an example, the upper surface of the nozzle wing 52 in FIG. 7 is monitored. The radiation detection unit 15 is inserted into a space between the nozzle wing 52 and a nozzle wing 51 from the upper left in FIG. 7. At this point, the radiation detection unit 15 is inserted into the space so that the scintillator 17 of the radiation detection unit 15 is opposite to the nozzle wing 52. After the insertion, the upper surface of the nozzle wing 52 is monitored. Since, as described above, the nozzle wing 52 extends in the direction perpendicular to the paper surface, the upper surface of the nozzle wing 52 can be monitored without omission by moving the radiation detection unit 15 in the direction perpendicular to the paper surface. After the monitoring of the upper surface of the nozzle wing 52 is completed, the radiation detection unit 15 is pulled out of the space and inverted around the axis in the longitudinal direction thereof. At this point, the scintillator 17 of the radiation detection unit 15 is positioned on the upper side of the radiation detection unit 15 in FIG. 7 so as to face the lower surface of the nozzle wing 52. In this state, the radiation detection unit 15 is inserted into a space between the nozzle wing 52 and a nozzle wing 53 again from the left side in FIG. 7 to monitor the lower surface of the nozzle wing 52 for radioactive contamination. In this manner, the monitoring of radioactive contamination of the upper and lower surfaces of the nozzle wing 52 is completed.

If monitoring of the right side of the nozzle wing 52 is not completed only from the left side in FIG. 7, the radiation detection unit 15 is inserted between wings from the right side in FIG. 7 to perform monitoring in the same way as described above.

According to an embodiment of the present application, as is evident from the above description of embodiments, a radioactive contamination monitoring method capable of simplifying radiation detection work of a through-hole, a non-through-hole, or an object to be monitored whose surrounding space is narrow, simplifying the processing method, shortening processes, and reducing work costs and also easily detecting radiation of a through-hole, a non-through-hole, or an object to be monitored whose surrounding space is narrow can be provided.

The present invention is not limited to the above embodiments as they are and structural elements thereof may be modified for embodiment in the stage of working without deviating from the spirit thereof. Moreover, various inventions may be formed by suitably combining a plurality of structural elements disclosed in the above embodiment. For example, some structural elements may be removed from all structural elements shown in the embodiment. Further, structural elements across different embodiments may suitably be combined.

REFERENCE SIGNS LIST 11, 16 Light guide bar
12, 14, 17 Scintillator
10, 13, 15 Radiation detection unit
18, 19, 23 Protective member
20, 20' Photoelectric conversion unit
21, 21' Signal processing unit
24 Non-through-hole
25 Through-hole
51, 52, 53 Nozzle wing

The invention claimed is:

1. A radioactive contamination monitoring device of an object to be monitored whose surrounding space is narrow, comprising:
    a radiation detection unit including a quadrangular prism-shaped light guide bar having a rectangular cross-section and a scintillator mounted on only two adjacent side faces of four side faces of the light guide bar;
    a photoelectric conversion unit that converts light generated in the radiation detection unit into electricity; and
    a signal processing unit connected to the photoelectric conversion unit.

2. The radioactive contamination monitoring device according to claim 1, wherein
    the light guide bar has a square cross-section, and
    the scintillator is further attached to a tip of the light guide bar.

3. The radioactive contamination monitoring device according to claim 1, wherein the scintillator is clad in a grid-like protective member.

4. The radioactive contamination monitoring device according to claim 2, wherein the scintillator attached to the tip of the light guide bar having the square cross-section and the scintillator mounted on the two adjacent side faces are clad in a grid-like protective member.

5. The radioactive contamination monitoring device according to claim 4, wherein the grid-like protective member is formed of stainless steel.

6. A radioactive contamination monitoring method of monitoring a surface of an inner surface of a through-hole for radioactive contamination, comprising:
    inserting the radiation detection unit according to claim 1 or 3 in which the light guide bar has a square cross-section into the through-hole;
    monitoring half the surface of the inner surface of the through-hole for the radioactive contamination;
    inverting the radiation detection unit around an axis in a longitudinal direction thereof; and
    monitoring the remaining surface of the inner surface of the through-hole for the radioactive contamination.

7. A radioactive contamination monitoring method of monitoring a surface of an inner surface of a non-through-hole for radioactive contamination, comprising:
    inserting the radiation detection unit according to claim 2 or 4 into the non-through-hole;
    monitoring at least half the surface of the inner surface of the non-through-hole for the radioactive contamination;
    inverting the radiation detection unit around an axis in a longitudinal direction thereof; and
    monitoring the remaining surface of the inner surface of the non-through-hole for the radioactive contamination.

8. A radioactive contamination monitoring method of an object to be monitored whose surrounding space is narrow for radioactive contamination, comprising:
    inserting the radiation detection unit according to claim 1 or 3 in which the light guide bar has a rectangular cross-section into the narrow space surrounding the object to be monitored;
    monitoring one side face of the object to be monitored for the radioactive contamination;
    inverting the radiation detection unit around an axis in a longitudinal direction thereof; and
    monitoring the other side face of the object to be monitored for the radioactive contamination.

* * * * *